(12) United States Patent
Mohan et al.

(10) Patent No.: US 11,467,365 B2
(45) Date of Patent: Oct. 11, 2022

(54) LENS ASSEMBLY AND CAMERA INCORPORATING A LENS ASSEMBLY

(71) Applicant: MOTOROLA SOLUTIONS, INC., Chicago, IL (US)

(72) Inventors: Sudeep Mohan, Surrey (CA); Nigel Geoffrey Taylor, Maple Ridge (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 422 days.

(21) Appl. No.: 16/701,979

(22) Filed: Dec. 3, 2019

(65) Prior Publication Data

US 2021/0165185 A1    Jun. 3, 2021

(51) Int. Cl.
*G02B 7/02* (2021.01)
*G03B 17/12* (2021.01)

(52) U.S. Cl.
CPC .............. *G02B 7/022* (2013.01); *G03B 17/12* (2013.01)

(58) Field of Classification Search
CPC ................................ G02B 7/022; G03B 17/12
See application file for complete search history.

(56) References Cited

U.S. PATENT DOCUMENTS

| 3,559,542 | A | 2/1971 | Clapp |
| 9,389,488 | B1 | 7/2016 | Kovacs |
| 11,269,238 | B2 * | 3/2022 | Lee ......................... G03B 17/12 |
| 2020/0241234 | A1 * | 7/2020 | Peng ..................... G03B 11/045 |

FOREIGN PATENT DOCUMENTS

| JP | 2006332814 A | * | 12/2006 |
| KR | 100862485 B1 | * | 10/2008 |

* cited by examiner

*Primary Examiner* — Clayton E. LaBalle
*Assistant Examiner* — Diana Hancock

(57) ABSTRACT

A lens assembly includes a lens with a lens barrel and a lens mount assembly. The lens mount assembly includes a lens mount barrel and a protrusion. First threads on the lens barrel and second threads on the lens mount barrel are shaped to permit the lens barrel and the lens mount barrel to be screwed together. The protrusion is positioned to interfere with at least one of the first and second threads as the lens barrel and the lens mount barrel are being screwed together. This interference resists rotation of the lens barrel relative to the lens mount barrel, thereby reducing the likelihood that the lens will be inadvertently screwed or unscrewed away from a desired depth.

8 Claims, 17 Drawing Sheets

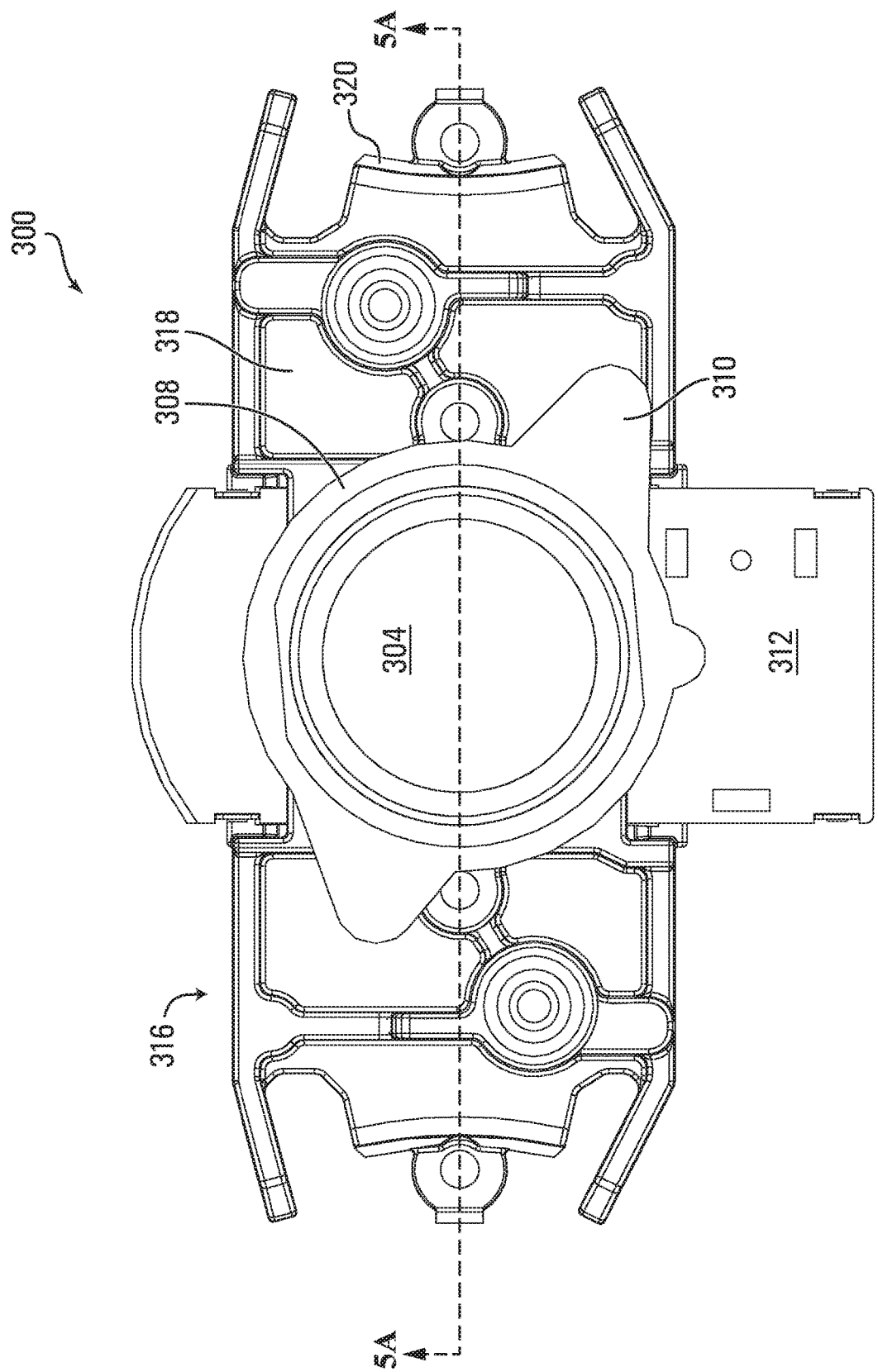

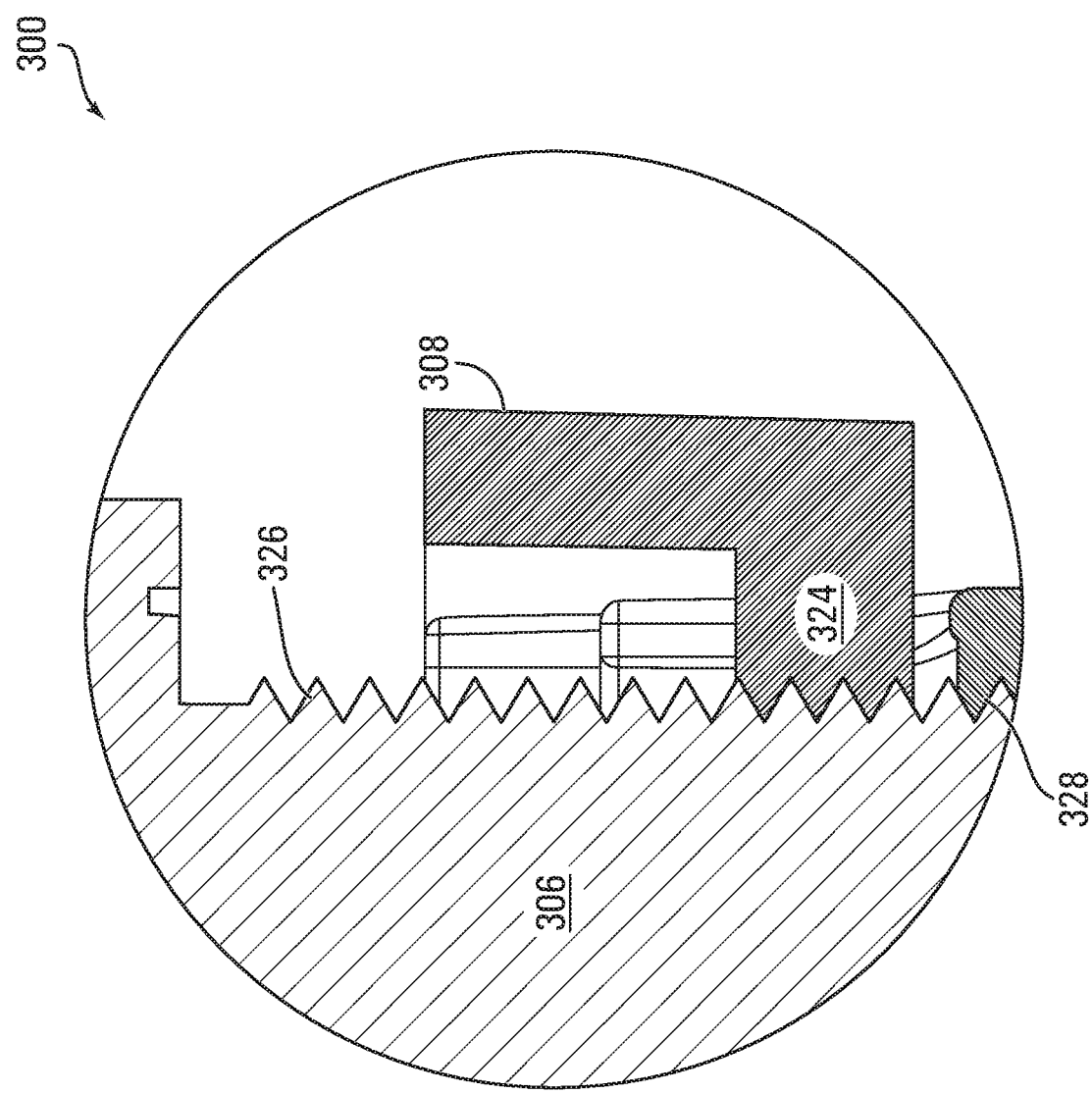

LENS ASSEMBLY AND CAMERA INCORPORATING A LENS ASSEMBLY

BACKGROUND

A lens in a camera is used to focus light so that an image may be resolved. For example, a camera may comprise a lens and a digital image sensor on to which the lens focuses light. During camera assembly, the lens may be secured using a type of lens mount that holds the lens in a desired position so that it may properly focus light on to the sensor.

BRIEF DESCRIPTION OF DRAWINGS

In the accompanying figures, similar or the same reference numerals may be repeated to indicate corresponding or analogous elements. These figures, together with the detailed description below, are incorporated in and form part of the specification and serve to further illustrate various embodiments of concepts that include the claimed invention, and to explain various principles and advantages of those embodiments.

FIGS. 4A-4F respectively depict front elevation, rear elevation, left side elevation, right side elevation, top plan, and bottom plan views of the lens assembly of FIG. 3;

FIG. 5B is a detailed view of the region labeled 5B in FIG. 5A;

Figure 1:
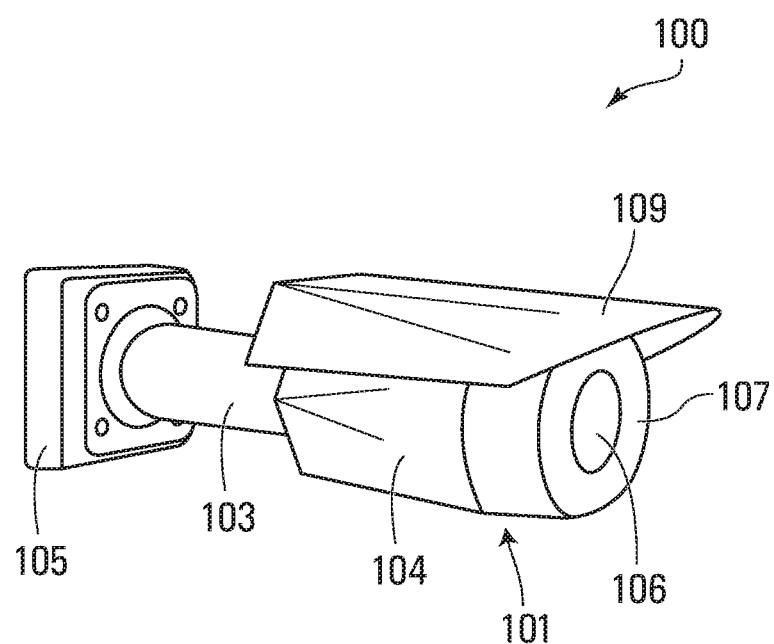
FIG. 1 depicts a perspective view of a camera, according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

According to one aspect, there is provided a lens assembly, comprising: a lens comprising a lens barrel, the lens barrel comprising first threads; and a lens mount assembly, comprising: a lens mount barrel comprising second threads, wherein the first and second threads are shaped to permit the lens barrel and the lens mount barrel to be screwed together using the first and second threads; and a protrusion positioned to interfere with at least one of the first and second threads as the lens barrel and the lens mount barrel are being screwed together, wherein interference between the protrusion and the at least one of the first and second threads resists rotation of the lens barrel relative to the lens mount barrel.

The protrusion may be positioned to interfere with the first threads.

The lens mount barrel may define an opening and the protrusion may extend into the lens mount barrel through the opening.

The opening may comprise a slot extending to an end of the lens mount barrel that receives the lens barrel.

The lens mount assembly may further comprise a collar, and the protrusion may comprise part of the collar.

The collar may be mounted outside of the lens mount barrel, and the lens barrel may be screwed into an interior of the lens mount barrel.

The protrusion may comprise one of multiple protrusions each comprising a respective part of multiple parts of the collar, and positioned to interfere with the at least one of the first and second threads, and the multiple protrusions may be radially symmetric about a longitudinal axis of the lens mount barrel.

The collar may comprise a ring portion from which the protrusion protrudes, and the ring portion may abut against a rim at an end of the lens mount barrel.

The lens mount assembly may further comprise a lens mount, the lens mount barrel may comprise part of the lens mount, and the collar may be movably mounted to the lens mount such that the collar moves in response to the interference between the protrusion and the at least one of the first and second threads.

The lens assembly may further comprise a circuit board to which the lens mount assembly is mounted, a longitudinal axis of the lens mount barrel may be perpendicular to the circuit board, and a longitudinal axis of the collar may be non-perpendicular to the circuit board.

The protrusion may deform in response to the interference.

According to another aspect, there is provided a lens assembly, comprising: a lens comprising a lens barrel, the lens barrel comprising first threads on an exterior side thereof; and a lens mount assembly, comprising: a lens mount, comprising: a platform; and a lens mount barrel extending from the platform and comprising second threads on an interior side thereof, wherein the lens mount barrel comprises multiple openings and wherein the first and second threads are shaped to permit the lens barrel to be screwed into the lens mount barrel using the first and second threads; and a collar mounted to the platform and comprising multiple inwardly extending and circumferentially positioned protrusions, wherein the protrusions extend into the lens mount barrel through the openings and are positioned to interfere with the first threads as the lens barrel is screwed into the lens mount barrel, wherein interference deforms the protrusions and consequently resists rotation of the lens barrel relative to the lens mount barrel.

The openings may comprise slots extending to an end of the lens mount barrel that receives the lens barrel.

The protrusions may be radially symmetric about a longitudinal axis of the lens mount barrel.

The collar may be movably mounted to the platform such that the collar moves in response to the interference between the protrusions and the first threads.

The lens assembly may further comprise a circuit board to which the platform is mounted, the platform and the circuit board may be parallel, and a longitudinal axis of the collar may be non-perpendicular to the circuit board.

According to another aspect, there is provided a lens assembly, comprising: a lens comprising a lens barrel, the lens barrel comprising first threads; and a lens mount assembly, comprising: a lens mount barrel comprising second threads on an interior side thereof, wherein the lens mount barrel comprises a rim at an end thereof and wherein the first and second threads are shaped to permit the lens barrel to be screwed into the lens mount barrel using the first and second threads; and a collar abutting the rim, the collar comprising multiple inwardly extending and circumferentially positioned protrusions, wherein the protrusions are positioned to interfere with the first threads as the lens barrel is screwed into or out of the lens mount barrel, wherein interference deforms the protrusions and consequently resists rotation of the lens barrel relative to the lens mount barrel.

According to another aspect, there is provided a lens assembly intended for use in a camera, the lens assembly comprising: a hollow cylindrical member having first and second ends and a lens fixedly attached at the first end, and wherein first threads are formed on an exterior surface of cylindrical member; a barrel defining a cavity sized to receive the cylindrical member, and wherein second threads are formed on an inner surface of the barrel, and the second threads being mateable with the first threads to permit the cylindrical member to be attached onto the barrel by rotated action, and wherein continued rotation in one direction causes the second end of the cylindrical member to move in a direction, perpendicular to a plane of rotation, between a first position at a top of the barrel to a second position below the top of the barrel; and a plurality of plastic protrusions positioned at the second position, the plastic protrusions configured to be forcibly deformed by the first threads, increasing immovability of the cylindrical member, when the cylindrical member is rotated in the one direction beyond the second position to a final position corresponding to the lens being focused.

According to additional aspects, there is provided a camera comprising the lens assembly of any of the foregoing aspects or suitable combinations thereof.

The foregoing does not necessarily describe the entire scope of all aspects. Other aspects, features and advantages will be apparent to those of ordinary skill in the art upon review of the following description of specific embodiments.

A task that may be performed when assembling a camera is mounting a camera lens on to a lens mount. The lens mount is intended to hold the lens steady and in a position that is suitable for focusing light entering the camera on to an image sensor. The lens may have a threaded lens barrel that can be screwed into a correspondingly threaded lens mount barrel on the lens mount. The depth to which the lens is screwed into the lens mount is selected during a calibration procedure to be suitable to the lens's focal length. Consequently, once the appropriate depth has been reached during calibration, the lens is preferentially retained at that depth.

One way in which the lens may be retained at the proper depth is by using glue. Using glue, however, requires additional equipment, is typically done manually and is consequently time consuming, potentially exposes workers to ultraviolet radiation used during curing, and raises the risk of a worker accidentally knocking the lens out of place.

Another way in which the lens may be retained is by using a set screw that extends through the side of the lens mount barrel and that is pressed against the side of the lens barrel. However, this may bias the lens in one direction, introducing undesirable tilt. Using a set screw also introduces risk that the lens may be hit when attempting to tighten the set screw, which may affect focus.

Another way in which the lens may be retained is by using a clamp around the lens mount barrel. This also requires additional equipment, is typically done manually and is consequently time consuming, raises the risk of a worker accidentally knocking the lens out of place, and also does not work well with metal lens mounts given their rigidity. Depending on the nature of the clamp, an undesirable tilt may also be introduced to the lens when the clamp is tightened.

In contrast to the aforementioned conventional solutions, in at least some example embodiments herein a lens assembly is described in which a lens is mounted to a lens mount assembly with the aid of one or more protrusions. The lens comprises a lens barrel that has first threads on its exterior, and the lens mount assembly comprises a lens mount barrel that has second threads on its interior. The outer diameter of the lens barrel is sized, and the first and second threads are shaped, to permit the lens barrel to be screwed into the lens mount barrel. Multiple protrusions extend into the lens mount barrel and contact the first threads while the lens barrel is being screwed into the lens mount barrel, and the first threads consequently deform the protrusions. This interference and consequent deformation between the protrusions and the first threads helps to secure the lens barrel in place. That is, the protrusions resist further rotation of the lens mount, thereby helping to prevent additional screwing or unscrewing and any unwanted depth changes. This is done without glue and without a tool such as a screwdriver.

The lens assembly described above may be incorporated into a security camera 101, such as that depicted in FIG. 1. In FIG. 1, the security camera 101 comprises part of a camera assembly 100. The camera assembly 100 also comprises a mounting arm 103 to which the camera 101 is movably coupled. On an opposite end of the mounting arm 103 is a junction box 105, which is mountable to a mounting surface such as a ceiling or wall (not shown). The camera assembly 100 also comprises a sun shroud 109 slidably coupled to the top of the camera 101. Additionally, while the camera 101 in FIG. 1 is a bullet camera, in alternative example embodiments (not depicted) it may be a different type of camera, such as a dome camera.

The camera 101 itself comprises a camera housing 104, which demarcates the interior of the camera 101 from the camera's 101 environment. A front portion 107 of the camera housing 104 comprises, at its front, a substantially flat face. At the center of the face is an optical aperture 106 through which light from the environment enters the camera 101.

Figure 2:
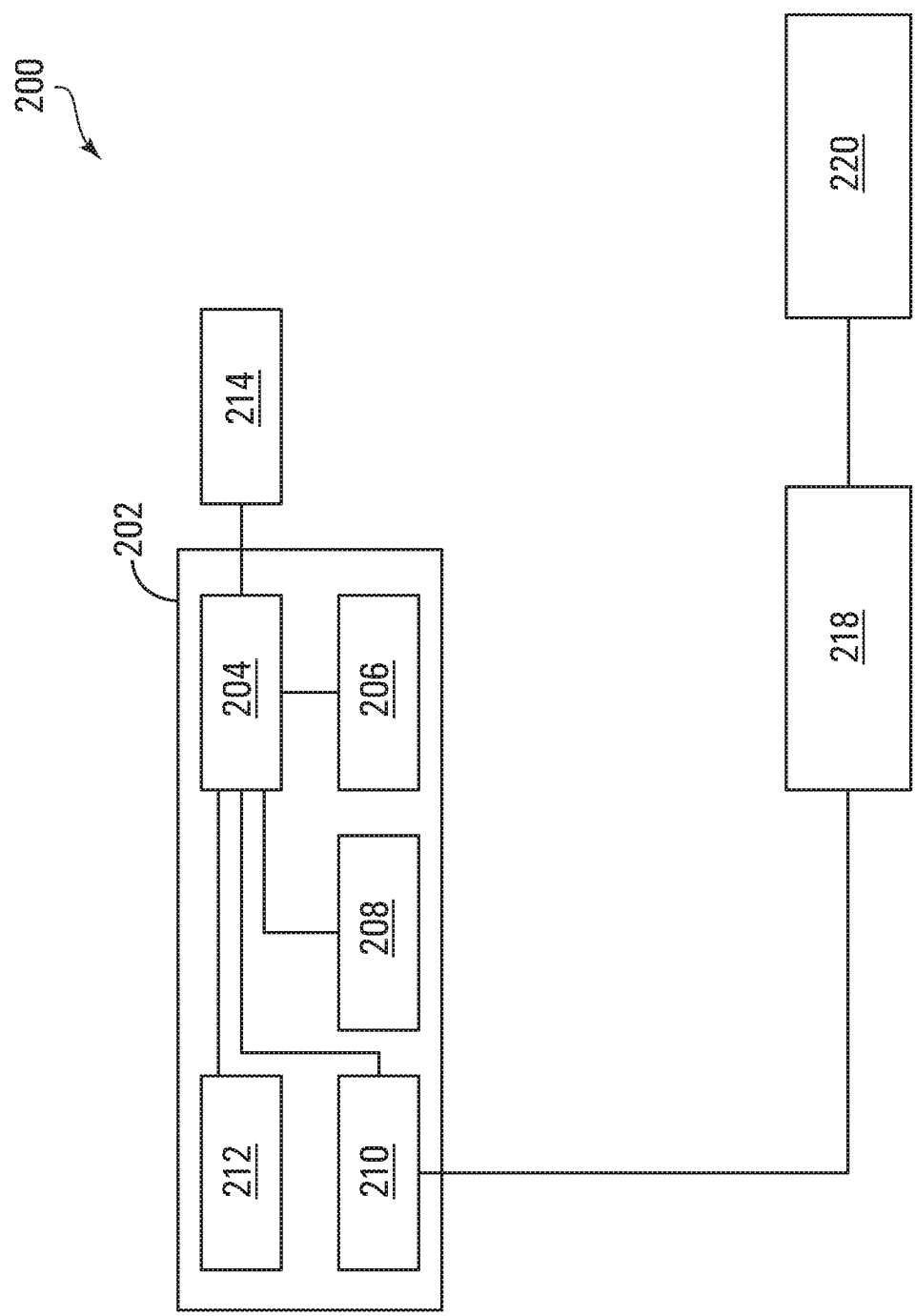
FIG. 2 depicts a block diagram of the camera of FIG. 1.

Referring now to FIG. 2, there is shown a block diagram of an imaging apparatus 200 that also comprises part of the camera 101. The imaging apparatus 200 comprises a system on a chip 202 (hereinafter "SoC 202"), which includes a processor 204 that is communicatively coupled to each of the SoC's 202 other components: an image signal processor 210, a media access controller 212, a general purpose input/output (GPIO) interface 206, and an I2C interface 208. The processor 204 is also communicatively coupled to memory 214 that is external to the SoC 202. Encoded on to the memory 214 is program code that the processor 204 can execute to operate the camera 101.

The imaging apparatus 200 also comprises an imager 218 communicatively coupled to the image signal processor 210. The imager 218 is configured to capture light in the visible spectrum and infrared spectrum, and can be, for example, a digital sensor such as a complementary metal-oxide-semiconductor (CMOS) sensor. The specifications of the imager 218 and the zoom lens 220 can be selected based on an operator's requirements and performance expectations.

In at least some alternative example embodiments (not depicted), one or more current drivers may be electrically coupled to respective GPIO lines connected to the GPIO interface 206. The current drivers may in turn be coupled to light sources such as infrared emitters positioned in the front portion 107 of the camera 101 that may be used to illuminate an imaged area with infrared light to provide night-vision functionality.

Figure 3:
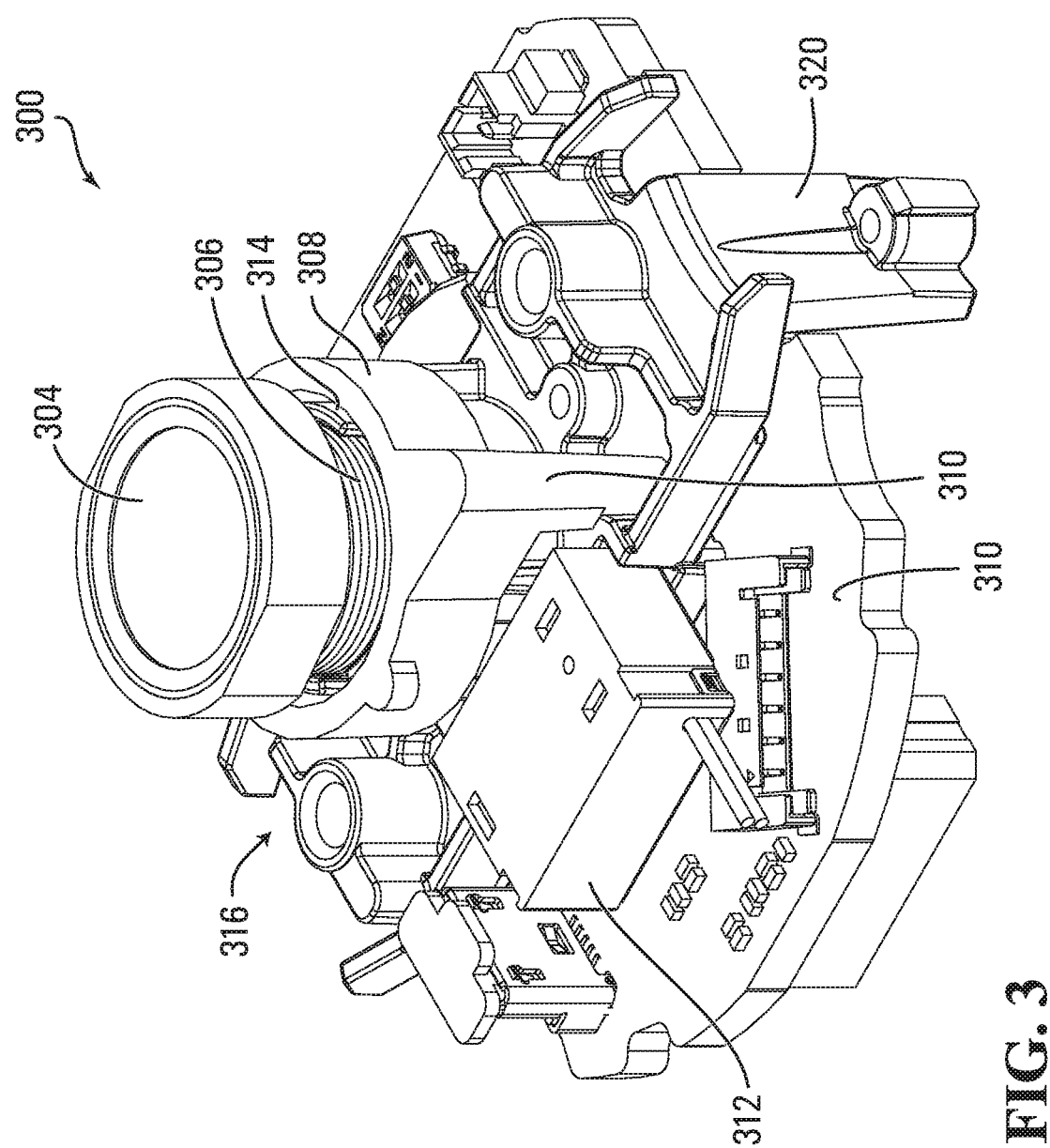
FIG. 3 depicts a perspective view of a lens assembly mounted on to a printed circuit board, according to an example embodiment.

FIG. 3 is a perspective view of a lens assembly 300, according to one example embodiment, positioned adjacent a printed circuit board (PCB) 302 within the camera 101. The lens assembly 300 and PCB 302 may be mounted in the front portion 107 of the camera 101, with the lens 304 positioned to receive light via the camera's 101 aperture 106. The imager 218 (not shown in FIG. 3) may be positioned on the PCB 302 and aligned with the lens's 304 longitudinal axis to receive light that the lens 304 focuses.

Figure 4A:
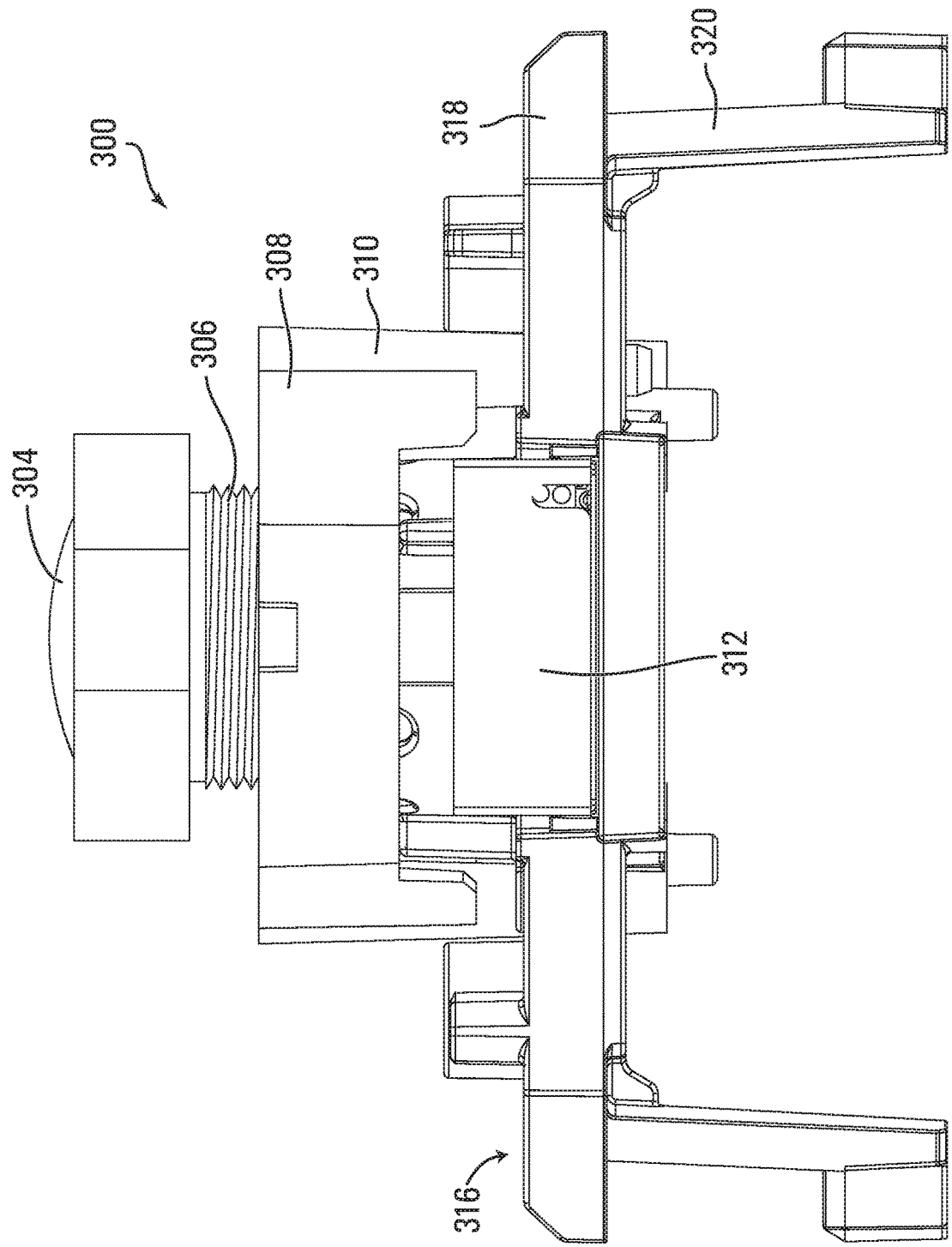
Figure 4B:
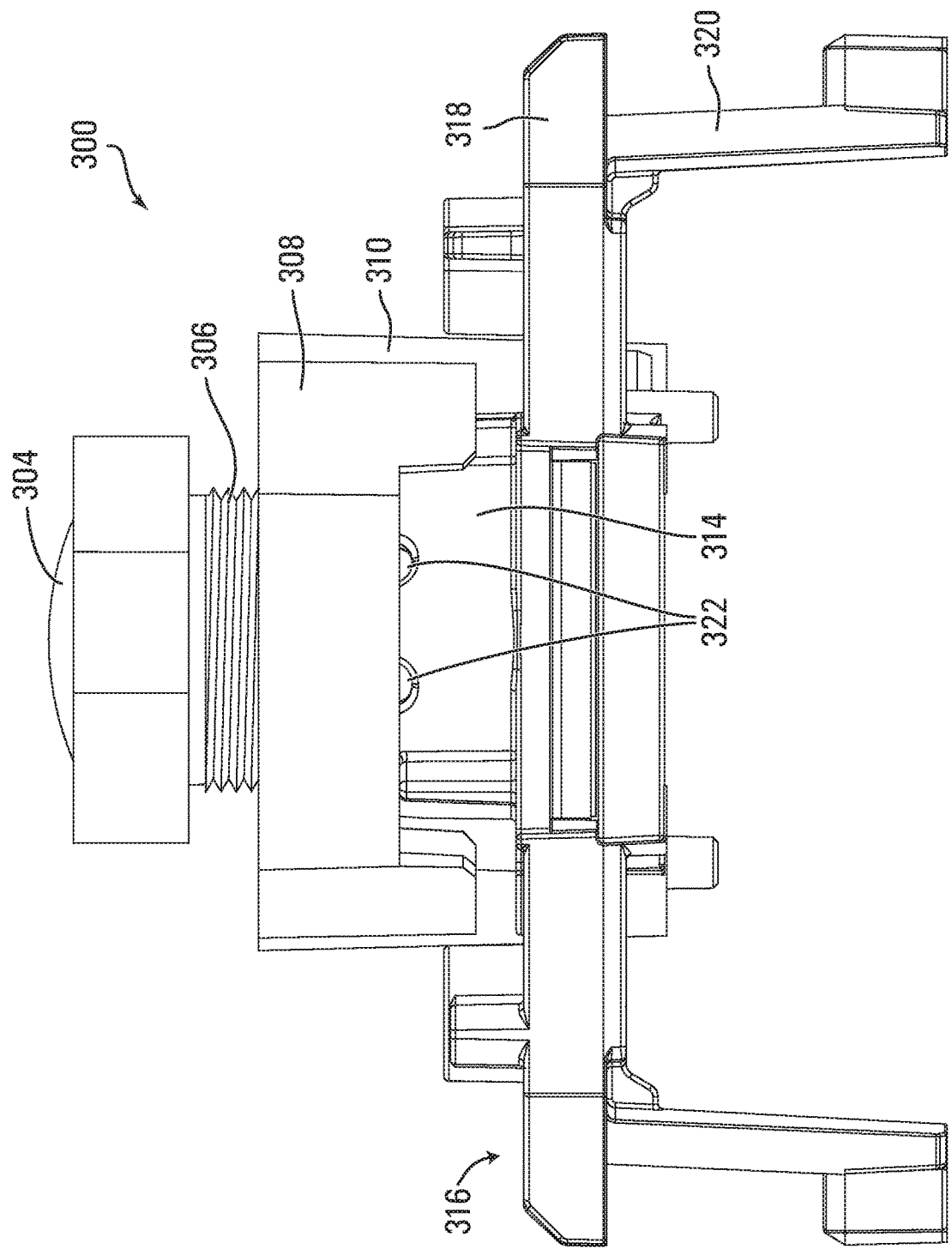
Figure 4C:
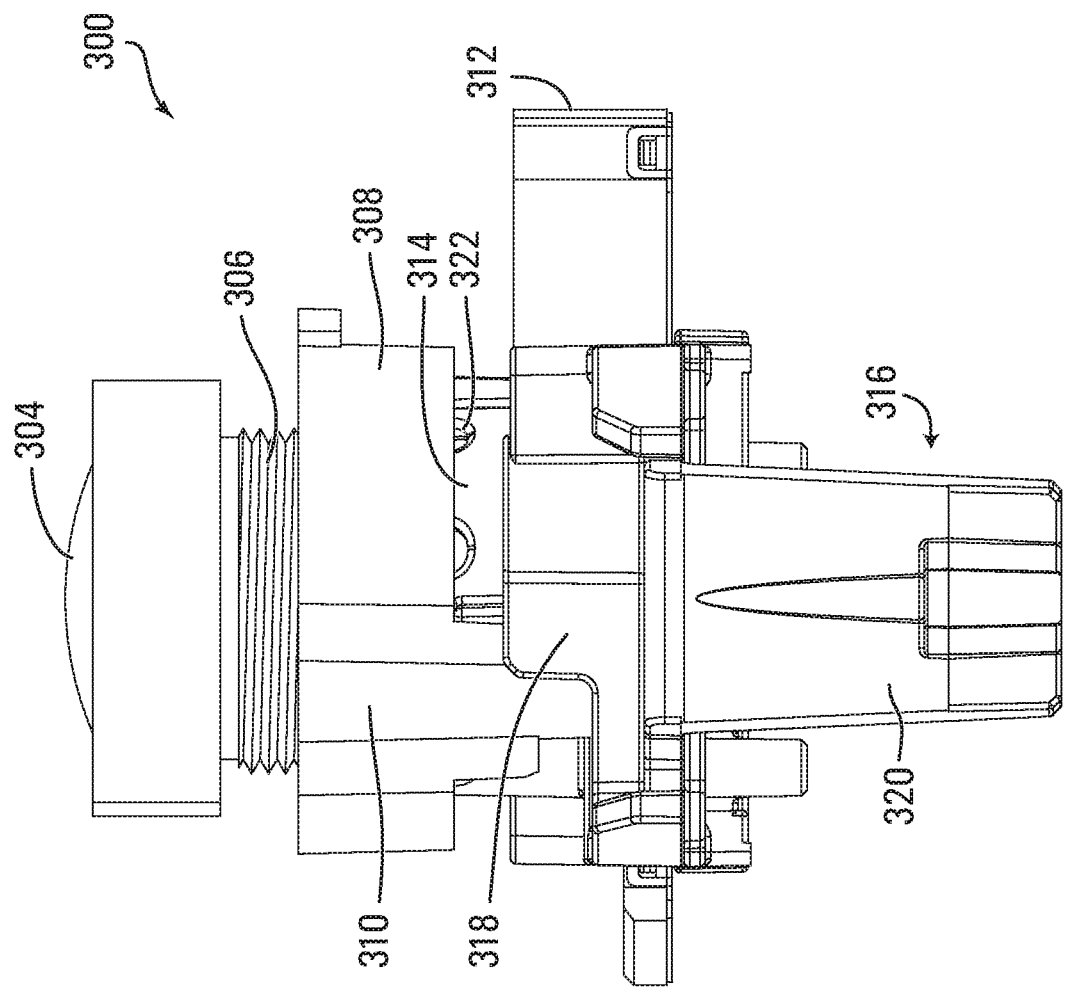
Figure 4D:
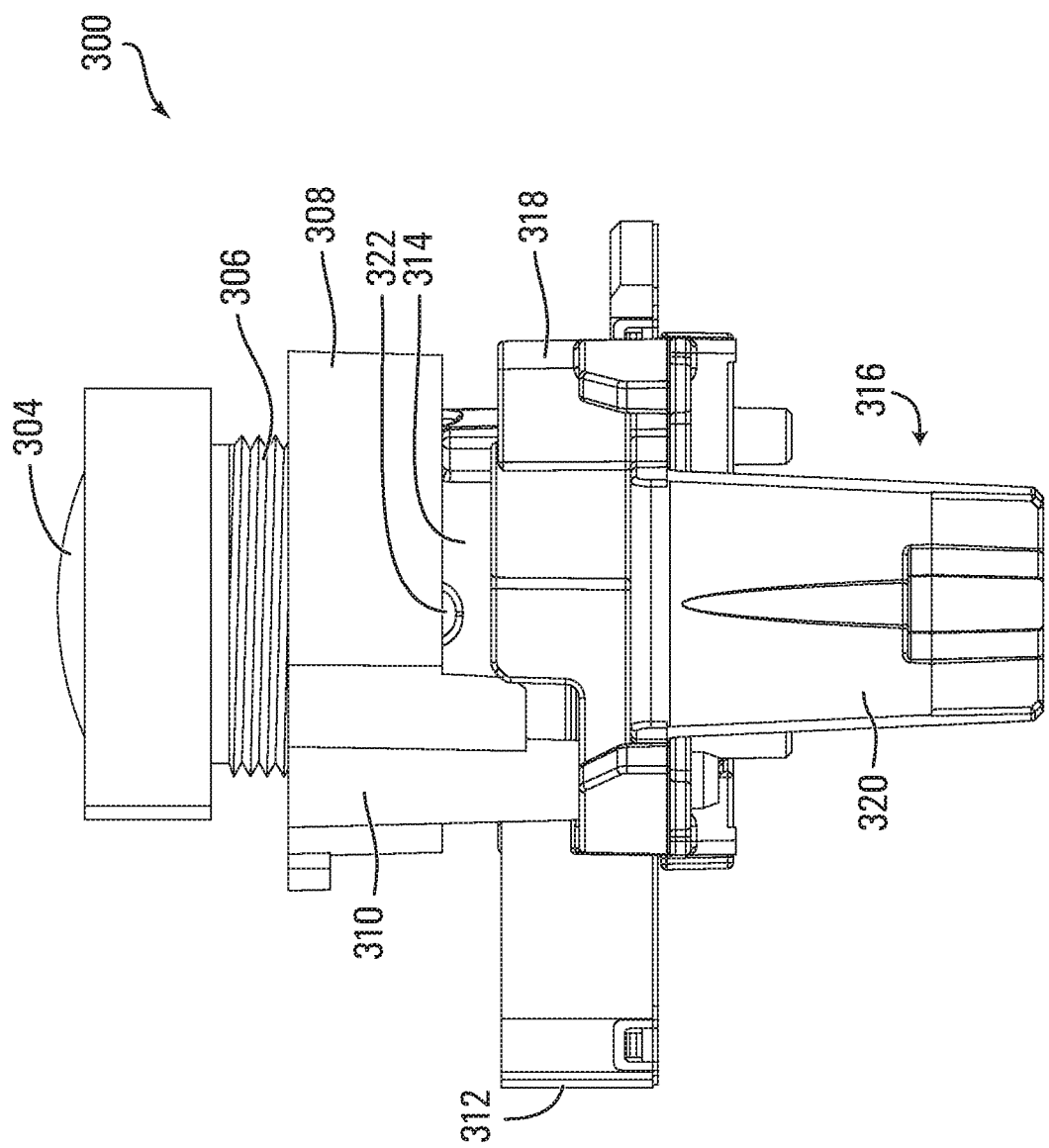
Figure 4F:
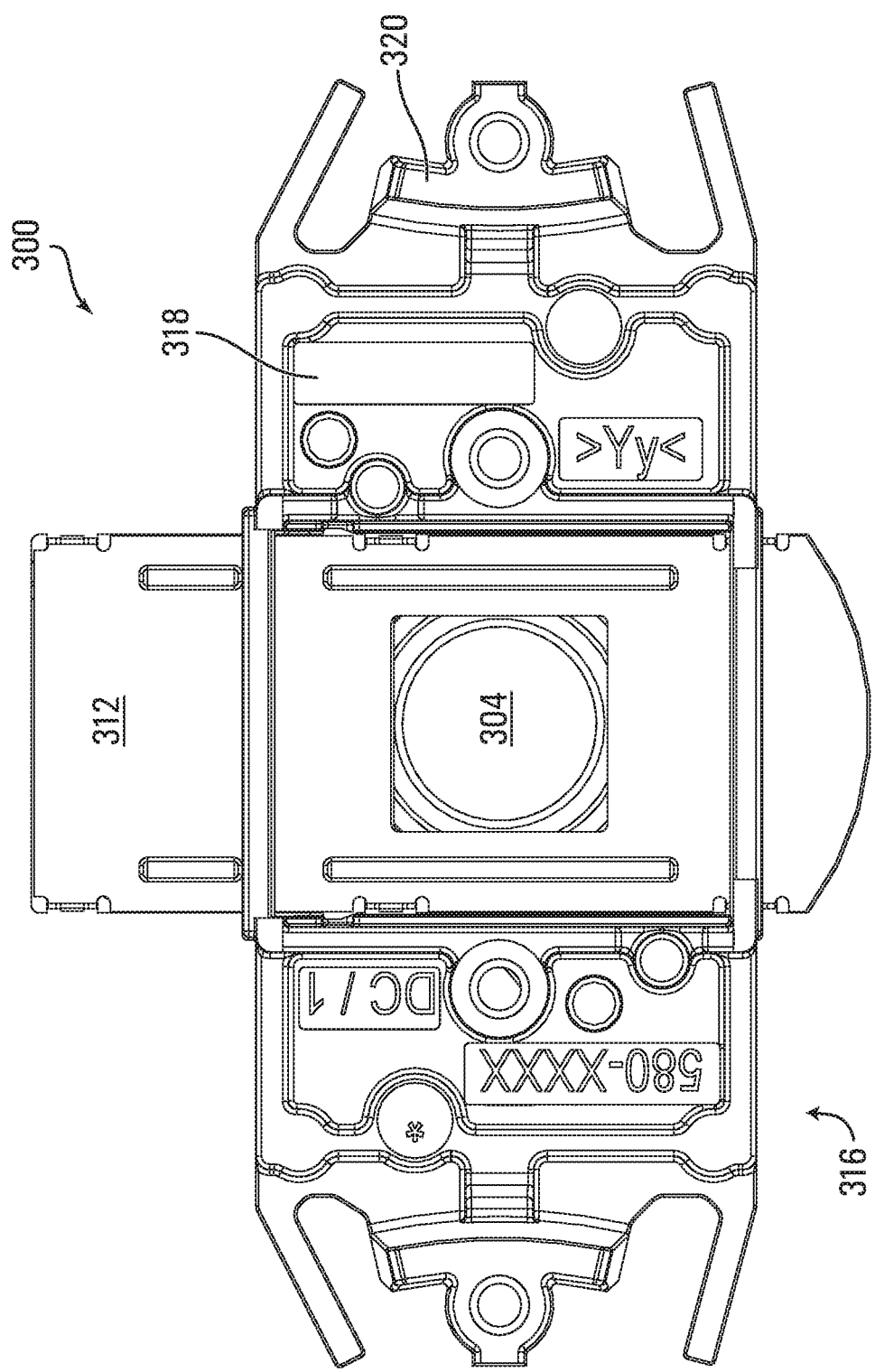
Figure 5A:
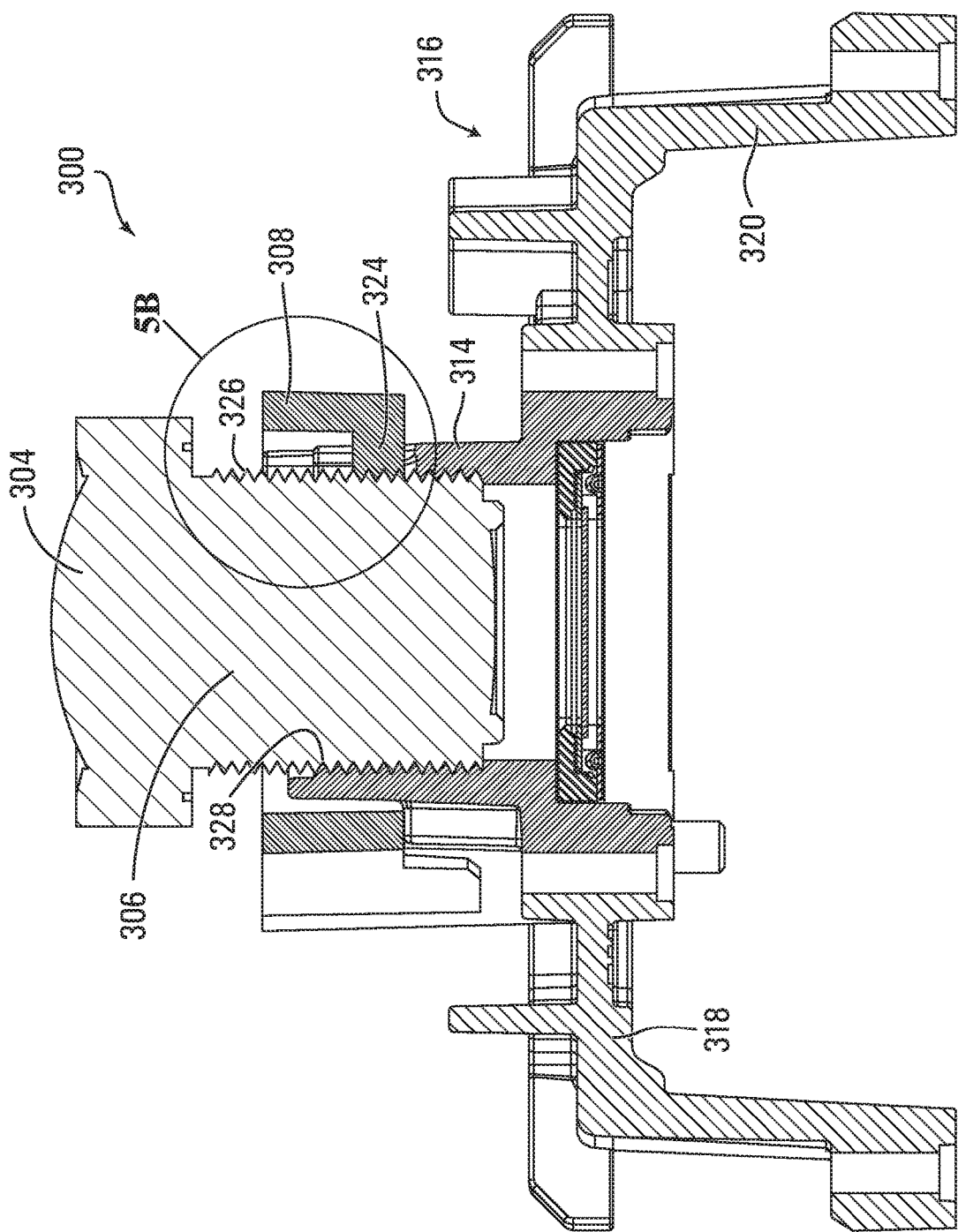
FIG. 5A depicts a sectional view of the lens assembly of FIG. 3 taken along line 5A-5A of FIG. 4E.
Figure 6:
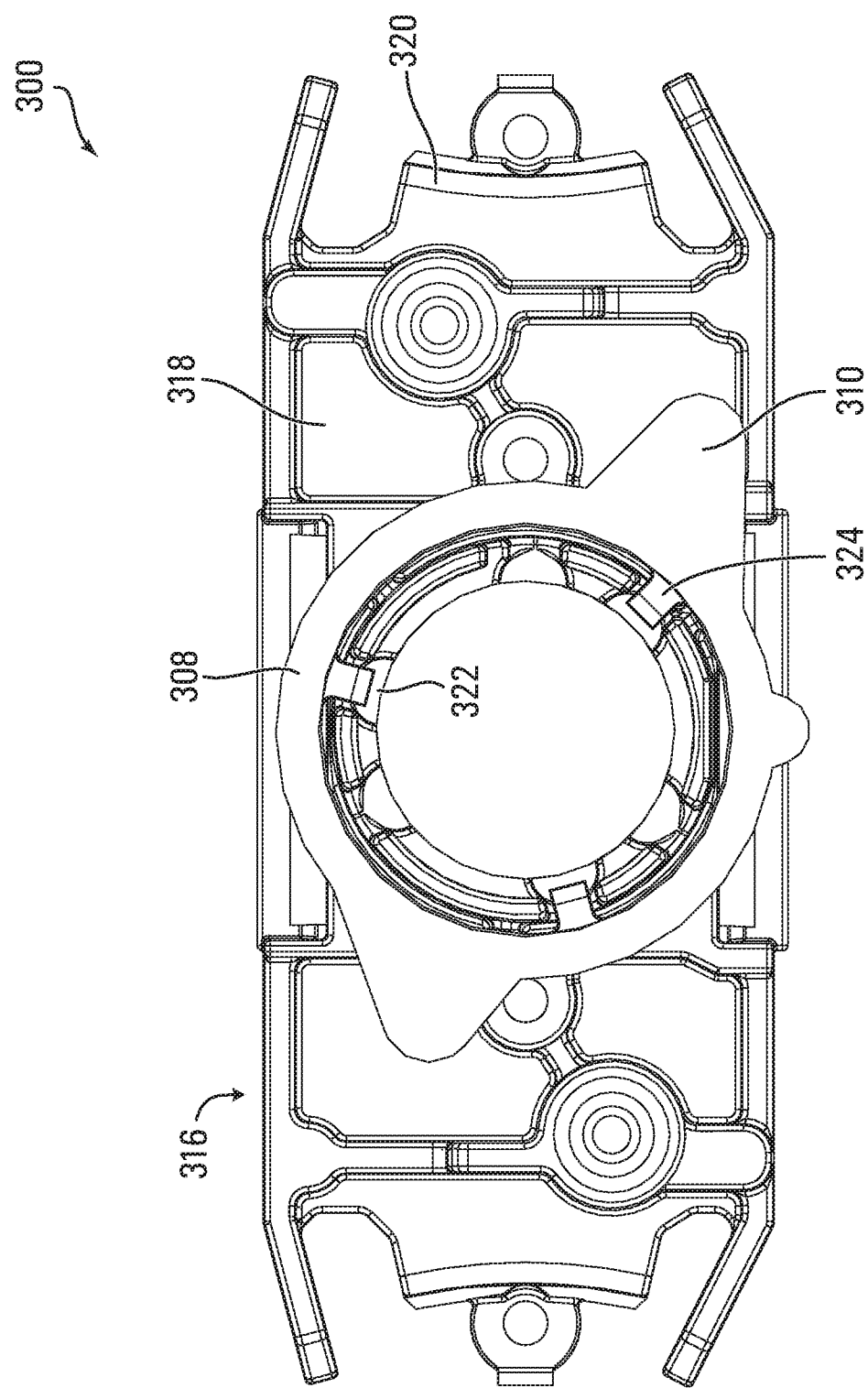
FIG. 6 is a top plan view of a lens mount and collar mounted thereon comprising part of a lens mount assembly, which comprises part of the lens assembly of FIG. 3.
Figure 7A:
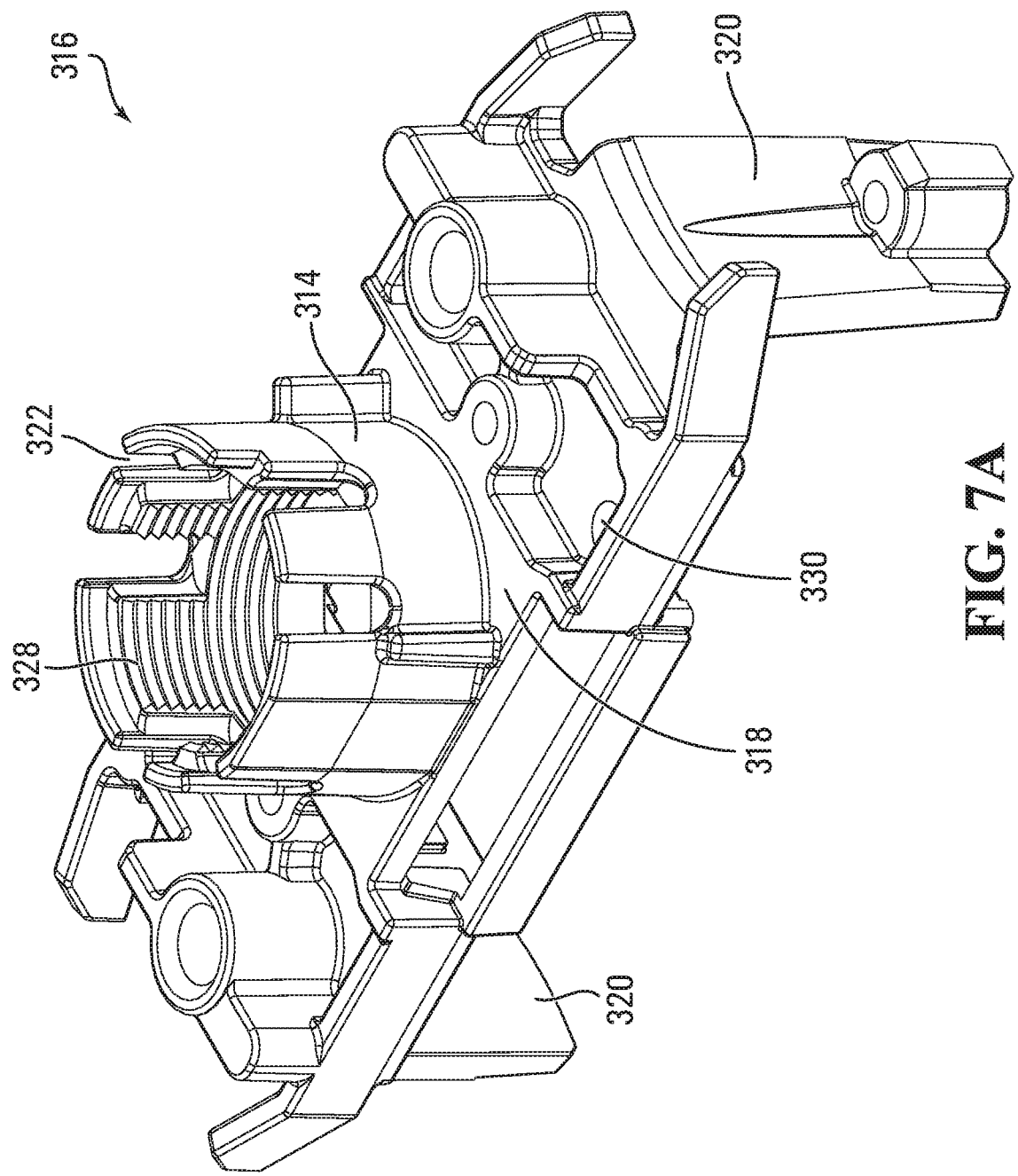
FIGS. 7A and 7B respectively depict in isolation perspective views of the lens mount and collar of FIG. 6.
Figure 7B:
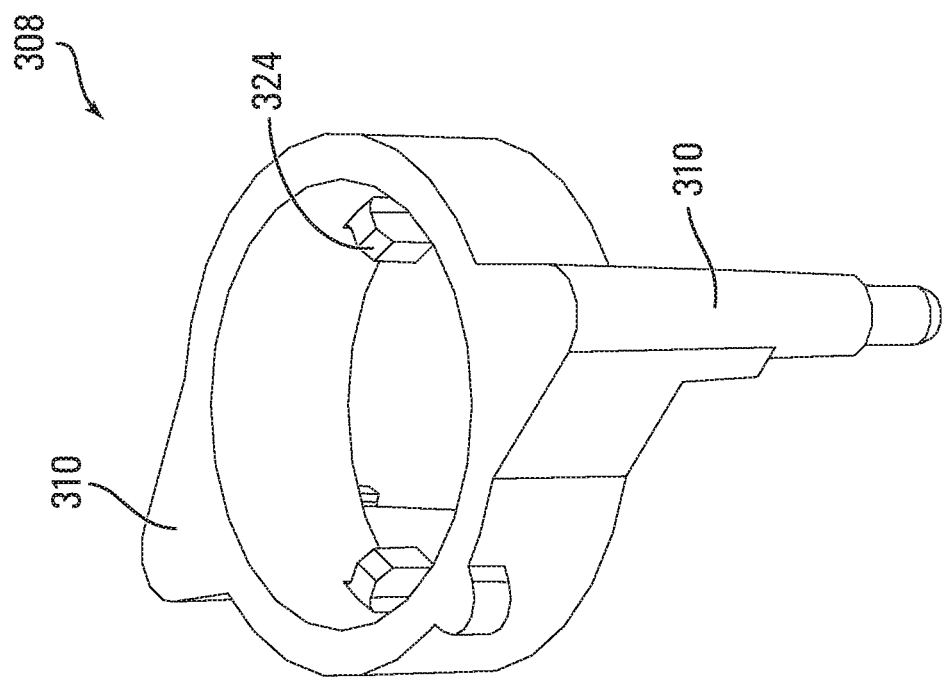

The lens assembly 300 generally comprises a lens 304, a lens mount 316 with an infrared (IR) filter 312, and a collar 308. FIGS. 4A-4F respectively depict front elevation, rear elevation, left side elevation, right side elevation, top plan, and bottom plan views of the lens assembly 300 in isolation. FIG. 5A is a sectional view taken along line 5A-5A of FIG. 4E, and FIG. 5B is a detailed view of the region labeled 5B in FIG. 5A emphasizing an interface between a protrusion 324 that comprises part of the collar 308 and threading on the lens 304. FIG. 6 is a top plan view of the lens mount 316 in isolation and with the IR filter 312 absent. FIGS. 7A and 7B respectively are perspective views, in isolation, of the lens mount 316 with the IR filter 312 absent and of the collar 308.

As depicted in these figures, the lens 304 comprises a lens barrel 306; and the lens mount 316 comprises a lens mount barrel 314 that receives the lens barrel 306, and a platform 318 from which the lens mount barrel 314 extends, and a pair of legs 320 between which the PCB 302 is located. In FIGS. 3 and 4A-4F, the IR filter 312 is attached to the lens mount 316 and positioned so that light focused by the lens may pass through the IR filter 312 prior to impacting the imager 218. The lens barrel 306 is substantially cylindrical and has an exterior side that is threaded with first threads 326 (depicted FIGS. 5A and 5B, discussed below), which are mateable with second threads 328 (depicted in FIG. 7A and in FIGS. 5A and 5B, discussed below) on an interior side of the lens mount barrel 314. The first and second threads 326, 328 are shaped to permit the lens barrel 316 to be screwed into the lens mount barrel 314 using the first and second threads 326, 328.

The collar 308 comprises a pair of posts 310 connecting a ring portion to the lens mount's 316 platform 318. As evident particularly in FIG. 7B, the collar 308 comprises multiple inwardly extending and circumferentially positioned protrusions 324. As evident particularly in FIG. 7A, the lens mount barrel 314 comprises multiple openings in the form of slots 322 that are correspondingly positioned relative to the protrusions 324. The slots 322 extend to the end of the lens mount barrel 314 that receives the lens barrel 306. Consequently, when the collar 308 is mounted to the lens mount's 316 platform 318 by inserting the collar's 308 posts 310 through receiving holes 330 on the platform 318, the protrusions 324 respectively extend through the slots 322 and into the lens mount barrel 314; this is particularly evident in FIG. 6. More particularly, and as discussed further below in respect of FIGS. 5A and 5B, the protrusions 324 extend sufficiently inwardly that they contact the first threads 326 on the lens barrel 306 when the lens barrel 306 is being screwed into the lens mount barrel 314. The depicted protrusions 324 are radially symmetric about a longitudinal axis of the lens mount barrel 314, although in other example embodiments (not depicted) the protrusions 324 may be asymmetrically positioned on the collar 308. Further, while multiple protrusions 324 are depicted, in at least some other example embodiments (not depicted) only a single protrusion 324 may be used.

Referring now to FIGS. 5A and 5B in particular, as the lens barrel 306 is screwed into the lens mount barrel 314, the first threads 326 on the lens barrel 306 contact and consequently are interfered with by the protrusions 324. The protrusions 324, which are deformable by virtue of being made with a material such as plastic, deform in response to the force exerted on them by the first threads 326. The resulting force that the protrusions 324 apply to the lens barrel 306 via the first threads 326 resists further rotation of the lens barrel 306. Consequently, inadvertent rotation of the lens barrel 306 that would change the depth of the lens barrel 306 within the lens mount barrel 314 and focus of the camera 101 is reduced. The interference accordingly resists further rotation, such as unscrewing, of the lens barrel 306 relative to the lens mount barrel 314.

The hardness of the protrusions 324 and the amount by which they enter the lens mount barrel's 314 interior are selected such that the lens barrel 306 can continue to be screwed into the lens mount barrel 314 even after deformation of the protrusions 324 begins. For example, during calibration a worker may begin screwing the lens barrel 306 into the lens mount barrel 314, encounter the protrusions 324 with the lens barrel 306, and with a reasonable amount of increased force continue to screw the lens barrel 306 into the lens mount barrel 314. This permits calibration to continue despite encountering the protrusions 324, while still permitting the protrusions 324 to perform their motion reducing function.

In order to properly focus light on the imager 218, the longitudinal axes of the lens barrel 306 and lens mount barrel 314 may be co-axial and perpendicular to the PCB's 302 surface. In other words, the platform 318 and PCB 302 may be parallel, and the longitudinal axis of the lens barrel 306 may be perpendicular to both. In order to avoid inadvertently tilting the lens 304 with the protrusions 324, the collar 308 may be movably mounted to the platform 318 such that the collar 308 moves in response to the interference between the protrusions 324 and the first threads 326 on the lens barrel 306. In other words, force that would serve to tilt the lens 304 if the collar 308 were rigidly fixed to the platform 318 may instead be used to move the collar 308 relative to the platform 318 instead of tilting the lens 304.

Figure 8:
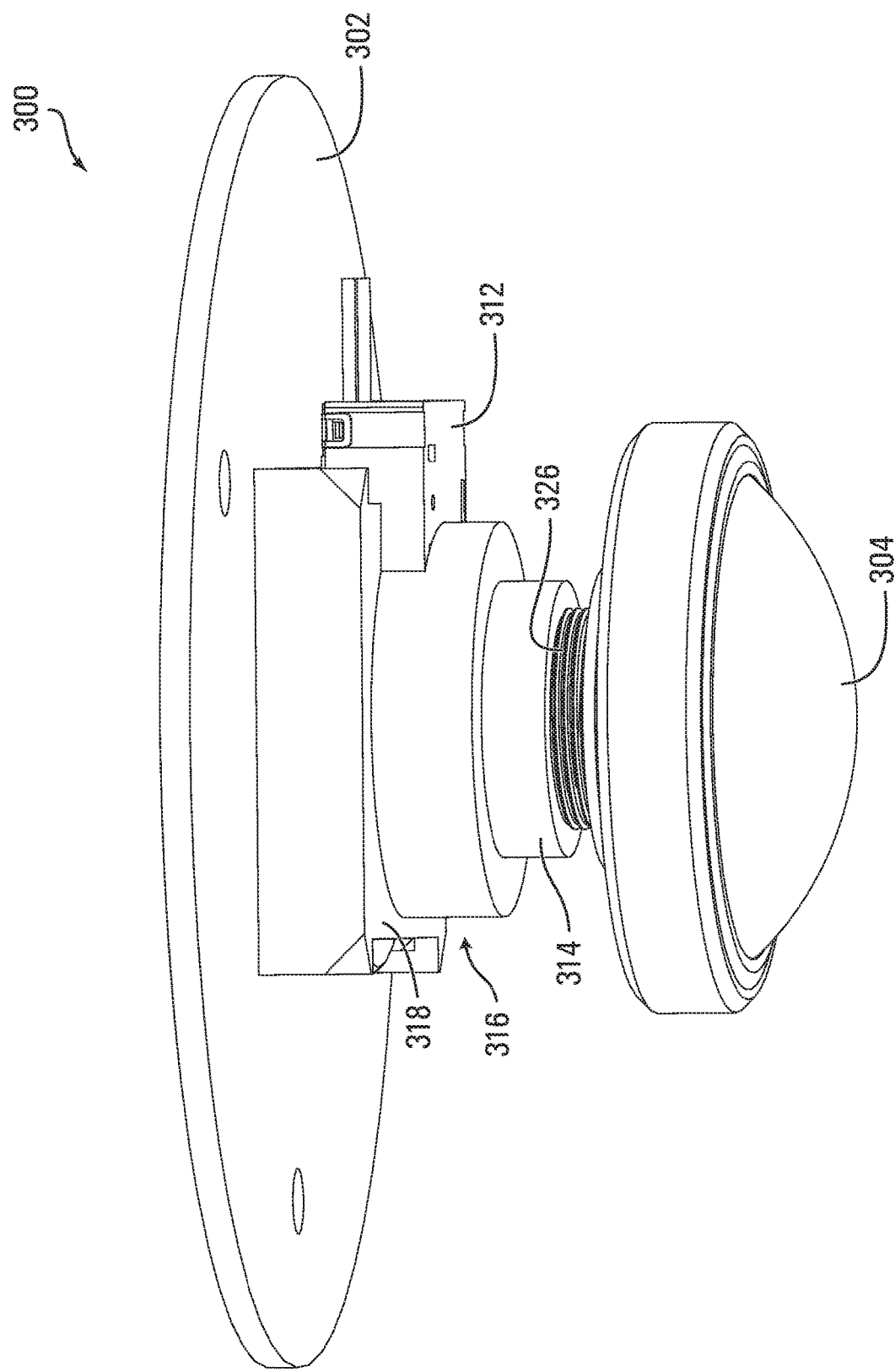
FIG. 8 depicts a perspective view of a lens assembly mounted on to a printed circuit board, according to another example embodiment.
Figure 9:
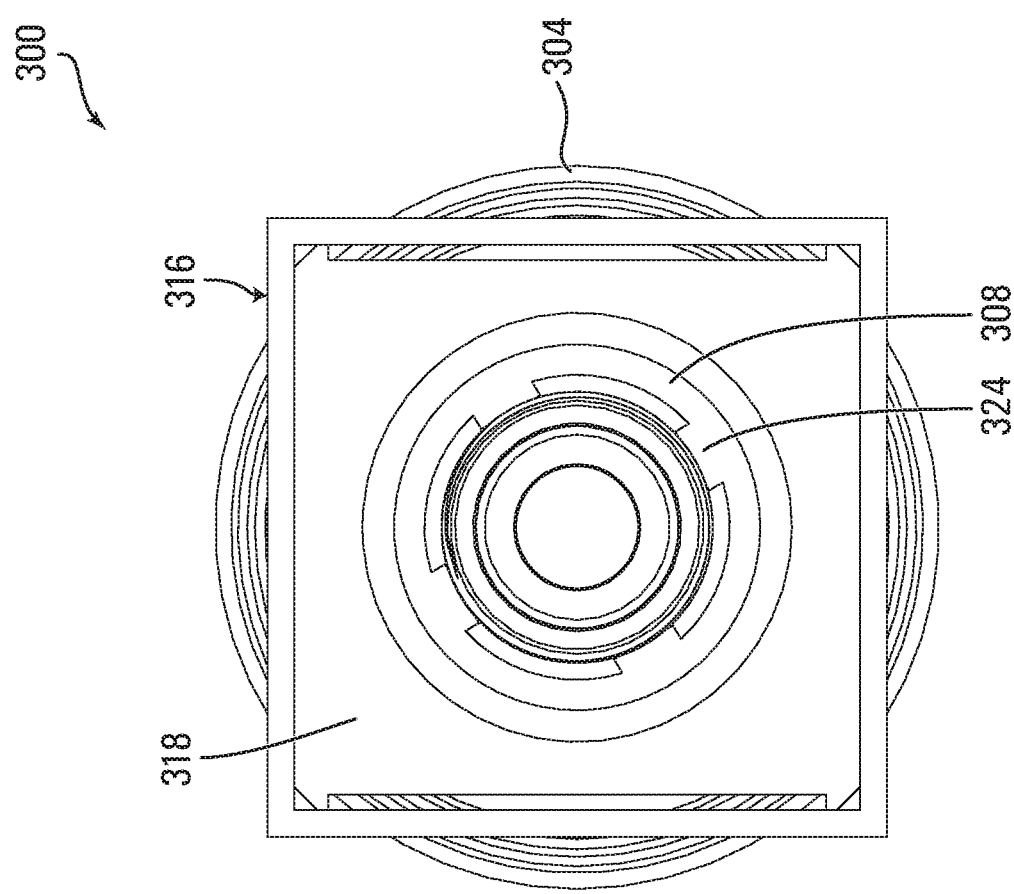
FIG. 9 depicts a top plan view of the lens assembly of FIG. 8.
Figure 10B:
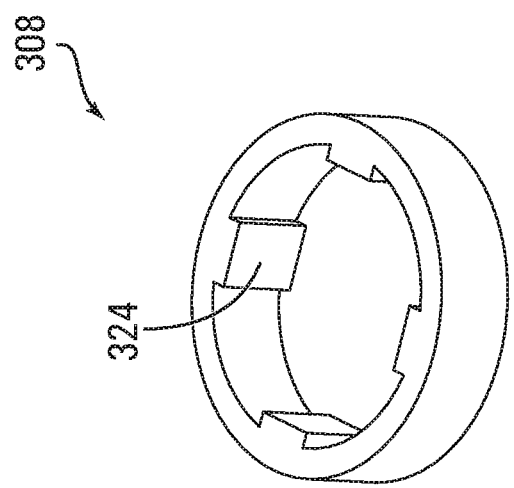
FIGS. 10A and 10B respectively depict in isolation perspective views of a lens mount and a collar, which comprise part of the lens assembly of FIG. 9.
Figure 10A:
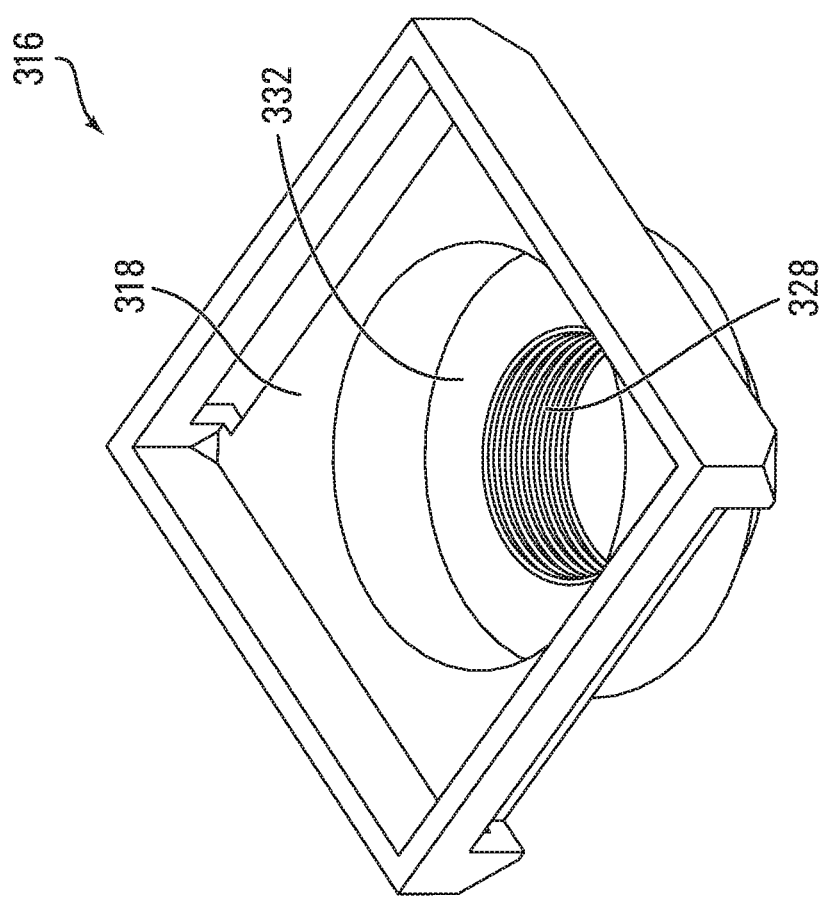

Referring now to FIG. 8, there is shown a perspective view of another example embodiment of the lens assembly 300 mounted on to the PCB 302. FIG. 9 shows a top plan view of the lens assembly 300 and the IR filter 312; and FIGS. 10A and 10B respectively show perspective views of the lens mount 316 and collar 308 in isolation. The lens assembly 300 of FIGS. 9 and 10 may be used, for example, in a fisheye camera.

As with the example embodiment of the lens assembly 300 depicted in FIG. 3, rotation of the lens barrel 306 is impeded in the example embodiment of FIG. 9 by virtue of interference between the protrusions 324 and the first threads 326 on the lens barrel 306 and the consequent deformation of the protrusions 324. More particularly, the lens assembly 300 of FIG. 9 is analogous to the lens assembly of FIG. 3 in that both comprise the lens 304, which includes the lens barrel 306 that is substantially cylindrical and has the first threads 326 on an exterior side thereof; the lens mount 316, which includes the platform 318 and the lens mount barrel 314 that is also substantially cylindrical, extends from the platform 318, and has the second threads 328 on an interior side thereof; and the collar 308, with multiple inwardly extending protrusions 324 positioned so that when the lens barrel 306 and lens mount barrel 314 are screwed together, interference between the protrusions 324 and the first threads 326 results.

In the lens assembly 300 of FIG. 3, the collar 308 is placed around the exterior side of the lens mount barrel 314 and consequently the slots 322 in the lens mount barrel 314 are used to permit the protrusions 324 to extend into the lens mount barrel's 314 interior. In contrast, and as is particularly evident in FIGS. 10A and 10B, the lens mount barrel 314 of the lens assembly 300 of FIG. 9 does not comprise any openings such as the slots 322. Rather, the rim 332 of one end of the lens mount barrel 314 acts as a seat against which the ring portion of the collar 308 abuts. The collar 308 may be secured against the rim 332 in any suitable manner. For example, if no movement is desired between the collar 308 and the lens mount 316, the collar 308 may be rigidly snapped in place, may rely on a press fit, or may be fastened in place using rigid fasteners. Alternatively, if relative movement between the collar 308 and the platform 318 is desired such as the type that the embodiment of FIG. 3 has, the collar 308 may be snapped in place using flexible members, or attached to the platform 318 using posts analogous to those used in the embodiment of FIG. 3. With the collar 308 in place, the protrusions 324 consequently interfere with the first threads 326 on the lens barrel 306 as the lens barrel 306 is exiting the lens mount barrel 314. As the collar 308 sits directly on the lens mount barrel's 314 rim 332, the collar 308 of FIG. 10B omits the posts 310 that the collar 308 of FIG. 7B relies on for mounting to the lens mount 316. In at least some different example embodiments, the collar 308 may be placed on the opposite end of the lens mount barrel 314, and the protrusions 324 may interfere with the lens barrel 306 as it is being screwed into the lens mount barrel 314.

Variations to the specific example of the lens mount assembly 300 depicted in the figures are possible in different example embodiments. For example, the openings in the lens mount barrel 314 do not have to be slots 322; rather, they may be apertures formed in the lens mount barrel's 314 wall and not extend up to an end of the lens mount barrel 314 as the slots 322 do. Additionally or alternatively, the protrusions 324 may interfere with the second threads 328 on the lens mount barrel 314 in addition to or alternatively to interfering with the first threads 326 on the lens barrel 306. As another example, the protrusions 324 may additionally or alternatively be mounted on a component other than the collar 308. For example, the protrusions 324 may be integral with one or both of the lens barrel 306 and lens mount barrel 314 themselves.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing", or any other variation thereof, are intended to cover a non-exclusive inclusion, such that a process, method, article, or apparatus that comprises, has, includes, or contains a list of elements does not include only those elements but may include other elements not expressly listed or inherent to such a process, method, article, or apparatus. An element proceeded by "comprises a", "has . . . a", "includes . . . a", or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about", or any other version thereof are defined as being close to as understood by one of ordinary skill in the art, and in one non-limiting embodiment the term is defined to be within 10%, in another embodiment within 5%, in another embodiment within 1%, and in another embodiment within 0.5%. The term "one of", without a more limiting modifier such as "only one of", and when applied herein to two or more subsequently defined options such as "one of A and B", should be construed to mean an existence of any one of the options in the list alone (e.g. A alone or B alone) or any combination of two or more of the options in the list (e.g. A and B together). A device or structure that is "configured" in a certain way is configured in at least that way, but may also be configured in ways that are not listed.

The terms "coupled", "coupling", or "connected" as used herein can have several different meanings depending on the context in which these terms are used. For example, the terms "coupled", "coupling", or "connected" can have a mechanical or electrical connotation. For example, as used herein, the terms "coupled", "coupling", or "connected" can indicate that two elements or devices are directly connected to one another or connected to one another through an intermediate element or device via an electrical element, electrical signal, or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject-matter lies in less than all features of a single disclosed embodiment. Thus, the following claims are hereby incorporated into the Detailed Description, with each claim standing on its own as separately claimed subject-matter.

The invention claimed is:

1. A lens assembly, comprising:
a lens comprising a lens barrel, the lens barrel comprising first threads on an exterior side thereof; and
a lens mount assembly, comprising:
  a lens mount, comprising:
    a platform; and
    a lens mount barrel extending from the platform and comprising second threads on an interior side thereof, wherein the lens mount barrel comprises multiple openings and wherein the first and second threads are shaped to permit the lens barrel to be screwed into the lens mount barrel using the first and second threads; and
  a collar mounted to the platform and comprising multiple inwardly extending and circumferentially positioned protrusions, wherein the protrusions extend into the lens mount barrel through the openings and are positioned to interfere with the first threads as the lens barrel is screwed into the lens mount barrel, wherein interference deforms the protrusions and consequently resists rotation of the lens barrel relative to the lens mount barrel.

2. The lens assembly of claim 1, wherein the openings comprise slots extending to an end of the lens mount barrel that receives the lens barrel.

3. The lens assembly of claim 1, wherein the protrusions are radially symmetric about a longitudinal axis of the lens mount barrel.

4. The lens assembly of claim 1, wherein the collar is movably mounted to the platform such that the collar moves in response to the interference between the protrusions and the first threads.

5. The lens assembly of claim 4, further comprising a circuit board to which the platform is mounted, wherein the platform and the circuit board are parallel, and wherein a longitudinal axis of the collar is non-perpendicular to the circuit board.

6. A camera comprising the lens assembly of claim 1.

7. A lens assembly, comprising:
a lens comprising a lens barrel, the lens barrel comprising first threads; and
a lens mount assembly, comprising:
  a lens mount barrel comprising second threads on an interior side thereof, wherein the lens mount barrel comprises a rim at an end thereof and wherein the first and second threads are shaped to permit the lens barrel to be screwed into the lens mount barrel using the first and second threads; and
  a collar abutting the rim, the collar comprising multiple inwardly extending and circumferentially positioned protrusions, wherein the protrusions are positioned to interfere with the first threads as the lens barrel is screwed into or out of the lens mount barrel, wherein interference deforms the protrusions and consequently resists rotation of the lens barrel relative to the lens mount barrel.

8. A camera comprising the lens assembly of claim 7.

* * * * *